United States Patent [19]
Hegler et al.

[11] Patent Number: 5,976,298
[45] Date of Patent: Nov. 2, 1999

[54] METHOD OF PRODUCING MULTILAYER THERMOPLASTIC PIPE

[75] Inventors: Ralph-Peter Hegler; Wilhelm Hegler, both of Bad Kissingen, Germany

[73] Assignee: Ralph-Peter Hegler, Germany

[21] Appl. No.: 08/598,474

[22] Filed: Feb. 8, 1996

[30] Foreign Application Priority Data

Feb. 13, 1995 [DE] Germany .......................... 195 04 501

[51] Int. Cl.⁶ ................................................. B29C 47/06
[52] U.S. Cl. ................................ 156/244.14; 156/244.21; 156/244.23; 156/285; 156/309.9; 156/322
[58] Field of Search .......................... 156/244.11, 244.13, 156/244.15, 244.21, 244.23, 309.9, 322, 244.14, 285

[56] References Cited

U.S. PATENT DOCUMENTS

| | | | |
|---|---|---|---|
| 2,888,954 | 6/1959 | Gates | 156/244.13 |
| 3,538,209 | 11/1970 | Hegler . | |
| 3,677,676 | 7/1972 | Hegler . | |
| 4,377,545 | 3/1983 | Hornbeck . | |
| 4,492,551 | 1/1985 | Hegler et al. . | |
| 4,588,546 | 5/1986 | Feil et al. | 156/244.13 |
| 4,900,503 | 2/1990 | Hegler et al. . | |
| 4,906,496 | 3/1990 | Hosono et al. | 428/36.9 |
| 5,330,600 | 7/1994 | Lupke | 156/244.15 |
| 5,346,384 | 9/1994 | Hegler et al. . | |
| 5,472,659 | 12/1995 | Hegler et al. . | |

FOREIGN PATENT DOCUMENTS

| | | |
|---|---|---|
| 0543243A1 | 5/1993 | European Pat. Off. . |
| 0600214A1 | 6/1994 | European Pat. Off. . |
| 1486473 | 6/1967 | France . |
| 1278734 | 9/1963 | Germany . |
| 2042031 | 10/1972 | Germany . |
| 1148277 | 4/1969 | United Kingdom . |
| 90/4208 | 11/1990 | WIPO . |

OTHER PUBLICATIONS

Patent Abstracts of Japan/JP59026224, vol. 8 No. 120/ Detecting Method of Anomalous Point of Extrudued Hollowpipe of Thermoplastic Resin.
EPO Search Report for EP 96101460.

*Primary Examiner*—Richard Crispino
*Attorney, Agent, or Firm*—Robert F. I. Conte; Lee, Mann, Smith McWilliams Sweeney & Ohlson

[57] ABSTRACT

For the production of a multilayer pipe of thermoplastic material, in particular polyolefine, an extrusion equipment is provided, extruding at least one tube in a direction of production. A calibrating arrangement for forming a pipe of externally profiled shape is provided downstream of the extrusion equipment. The calibrating arrangement is followed by a preheater for heating to welding temperature the outer surfaces of the externally profiled shape. Furthermore, a coextruding head is provided, having an extruder for coextruding a tube around the pipe, the coextruding head having a partial vacuum connecting line for the tube and the outer surfaces to be welded together under the difference pressure between ambient pressure and partial vacuum.

8 Claims, 3 Drawing Sheets

METHOD OF PRODUCING MULTILAYER THERMOPLASTIC PIPE

BACKGROUND OF THE INVENTION

1. Field of the Invention

The invention relates to a method for the production of a multilayer pipe of thermoplastic material, in particular polyolefine, and an installation for putting the method into practice.

2. Background Art

Multilayer pipes, in particular three-layer pipes, are known from U.S. Pat. No. 3,538,209 and U.S. Pat. No. 3,677,676.

German published patent application 20 42 031 teaches a method and an apparatus for the production of three-layer pipes of thermoplastic material, a twin-wall pipe provided with an exterior corrugated pipe being produced in usual manner. A tube is injection-molded around this twin-wall pipe in a coextruding head, the tube being vacuum-calibrated in a downstream external calibrating arrangement. Three-layer pipes produced in this way can be used as protective pipes, in particular as cable ducts and drain channels, if they are not exposed to any substantial pressure from the inside. The problem with this way of producing multi-layer pipes resides in that no reliable welding is obtained between this tube for the production of an exterior pipe or a skin and the pipe produced and externally shaped in advance. In particular when polyolefines, such as polyethylene, are used, the pipe produced and externally shaped in advance can exhibit considerable tolerances in outside diameter, there being no defined conditions for the known external vacuum calibration.

SUMMARY OF THE INVENTION

It is the object of the invention to create a method and an installation for the production of multilayer pipes that is indifferent to outside diameter tolerances of the pipe to be coated by a tube.

In a method according to the invention, this object is solved by the following steps: producing in a direction of production a pipe of externally profiled shape; heating to welding temperature at least the outer surfaces of the externally profiled shape; acting on the outside of the pipe by—referred to ambient pressure—partial vacuum; extruding a tube of plastic material on to the outer surfaces of the pipe of externally profiled shape acted upon by partial vacuum; welding together the tube and the outer surfaces under the difference pressure between ambient pressure and partial vacuum; and cooling the multilayer pipe. In an installation according to the invention, this object is attained by an extrusion equipment for extruding at least one tube in a direction of production, by a calibrating arrangement for forming a pipe of externally profiled shape, by a preheater for heating to welding temperature the outer surfaces of the externally profiled shape, and by a coextruding head having an extruder for coextruding a tube around the pipe, the coextruding head having a partial vacuum connecting line.

The gist of the invention resides in that care is taken of the fact that the outer surfaces, on which to weld the tube subsequently applied by extruding, of the pipe produced in advance are heated to welding temperature and that the tube is pressed against these outer surfaces in that a pressure difference acting on the tube from the outside forces the latter against the outer surfaces of the pipe. During the ensuing cooling, this pressure difference is not only maintained, but it increases, experience showing that it is almost impossible to pull or tear this smooth skin off the finished multilayer pipe. The advantage of the multilayer pipe produced according to the invention resides in that with an increase in weight of only 20 to 30 percent, the rigidity of the pipe will double.

This is in particular true for twin-wall pipes coated by such an exterior pipe. Since such a multilayer pipe has a smooth outer face, it can easily be handled during transport and placing. There is no longer the problem occurring in particular with ribbed pipes which resides in that the pipe, when placed, cannot be slid along the ground because the ribs will dig into the ground. Since there is a smooth skin, branches can be produced very easily, the additional skin providing for increased protection against leakage.

Details of the invention will become apparent from the ensuing description of exemplary embodiments, taken in conjunction with the drawing.

DESCRIPTION OF THE PREFERRED EMBODIMENTS

Figure 1:
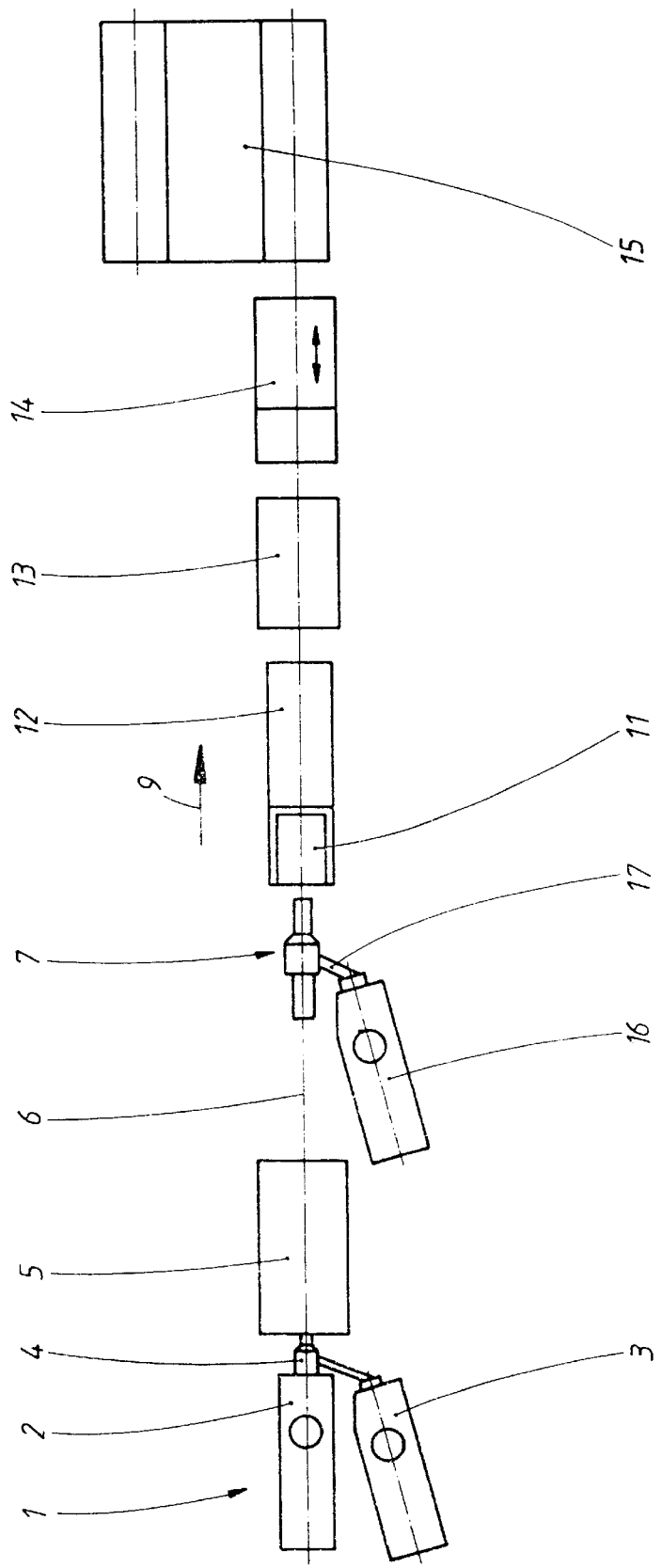
FIG. 1 is a diagrammatic illustration of an installation for the production of a three-layer pipe.

FIG. 1 illustrates an installation for the production of multilayer pipes, in particular three-layer pipes. An extrusion equipment 1 is shown on the left of the drawing, comprising a first extruder 2 and a second extruder 3, which, from a common extruding head 4, extrude two tubes concentric of each other of thermoplastic material, in particular polyolefine, these tubes being formed into a twin-wall pipe in a subsequent calibrating arrangement 5. Such an extruding head 4 is known for instance from U.S. Pat. No. 3,677,676. Such a calibrating arrangement S is likewise known, for instance from U.S. Pat. No. 4,492,551. If a so-called ribbed pipe is to be manufactured, then provision must be made for a single extruder. A corresponding calibrating arrangement is known for instance from U.S. Pat. No. 4,900,503. The pipe leaves the calibrating arrangement 5 in a condition cooled down to be dimensionally stable. An extruding head 7 is disposed coaxially of the central longitudinal axis 6 of the calibrating arrangement 5, the twin-wall pipe 8 entering the extruding head 7 in the direction of production 9. This extruding head 7 is shown in detail in FIG. 2, which will still be dealt with below. In the extruding head 7, a tube forming an exterior pipe or a skin is injection-molded around the pipe 8. Subsequently, the multilayer pipe 10 thus formed first runs through an air cooling bath 11 and then enters a water cooling bath 12. The discharge of the multilayer pipe 10 in the direction of production 9 takes place by means of a discharge arrangement 13, which, in known manner, can be in the form of a so-called belt conveyor or crawler type discharge. This discharge arrangement 13 can be followed in the direction of production 9 by a separating station 14, for instance in the form of a saw, which may again be followed by a so-called socketing machine 15, on which to injection-mold sockets around individual pipe sections.

Upstream of the extruding head 7, provision is made for a third extruder 16, a melt conducting pipe 17 connecting the extruder 16 to a substantially annular base body 18 of the coextruding head 7. On the side turned towards the calibrating arrangement 5, i.e. upstream of the base body 18 seen in the direction of production 9, a preheater 19 is provided on the base body 18, comprising a thin-wall tubular support 20 of good thermal conductivity and a heater 21, for instance in the form of a strip heater, disposed on this support 20. On the pipe inlet side 22, i.e. at the front end of the preheater 19—referred to the direction of production 9—a sealing arrangement 23 is provided on the inside of the support 20, sealing the interior chamber 24 of the extruding head 7 on the pipe inlet side 22. This sealing arrangement 23 is such that it bears on the outside of the pipe 8 and can compensate for major changes in outside diameter of the pipe 8.

A coextrusion die 25 is provided on the other side, i.e. on the rear end of the base body 18 seen in the direction of production 9. An inner die pipe 26 is fastened to the base body 18 by means of screws which are only roughly outlined. Further, an outer adjusting ring 27 is mounted on the base body 18 by means of screws likewise only roughly outlined. The inner die pipe 26 is enclosed by an outer die pipe 28, an approximately annular melt passage 29 being defined between the die pipes 26 and 28.

Adjusting screws 30 extending radially to the axis 6 and bearing against the outer die pipe 28 are retained in the adjusting ring 27. The outer die pipe 28 is centered by means of these adjusting screws 30, the melt passage 29 thereby being given precisely the desired cross-sectional dimensions. At the rear end 32, seen in the direction of production 9, of the die 25, the inner die pipe 26 has an annular collar 31 retaining adjusting pressure screws 33 which bear against the facing end 32 of the outer die pipe 28. Further, adjusting tension screws 34 are retained in this annular collar 31, engaging with threaded holes 35 of the outer die pipe 28 in the vicinity of the latter's end 32. The adjusting pressure screws 33 and the adjusting tension screws 34 serve to adjust the outer die pipe 28 in the direction of the axis 6 or even to tilt it slightly relative to the axis 6. The width a of the die mouth 36 can thus be adjusted even in such a way that this width a varies over the circumference. The way of adjusting a die is illustrated and described in detail by U.S. Pat. No. 5,346,384, to which reference is made.

The melt passage 29 is connected to the melt conducting pipe 17. The base body 18, the adjusting ring 27 and the outer die pipe 28 are surrounded by melt heaters 37 which keep the melt 38 at the necessary extruding temperature.

The base body 18 is provided with a partial vacuum connecting line 39 which opens into the interior chamber 24 of the coextruding head 7. This interior chamber 24 extends over the entire length of the coextruding head 7. On the pipe outlet side 40, i.e. at its rear end seen in the direction of production 9, this substantially tubular inner chamber 24 has a cylindrical section 41, the inside diameter D of which exceeds the greatest outside diameter d of the pipe 8. The die mouth 36 is formed at the rear end 42, seen in the direction of production 9, of the coextrusion die 25.

The way of operating is as follows:

A twin-wall pipe 8 passes in the direction of production 9 from the extrusion equipment 1, which comprises the calibrating arrangement 5, to the coextruding head 7. This twin-wall pipe 8 consists in usual manner of a smooth inside pipe 43 and a corrugated outer pipe 44. This corrugated pipe 44 has annular—or for special applications even helically extending—cylindrical outer surfaces 45. The sealing arrangement 23 bears against these cylindrical outer surfaces 45 in such a way that it will always bear against at least one outer surface 45. In this way, the interior chamber 24 is sealed towards the atmosphere in this area.

Especially the outer surfaces 45 are heated by the preheater 19 to a temperature that is necessary for welding with weldable plastic material. As the case may be, it can be necesary to do without the preheater 19, because the heat dissipated by the extruding head 7 to the twin-wall pipe 8 can be sufficient to heat in particular the outer surfaces 45 to a temperature sufficient for welding. The pipe 8 passes through the interior chamber 24 of the extruding head 7, which is acted upon by partial vacuum, i.e. by a pressure below atmospheric, by way of the partial vacuum connecting line 39. From the die mouth 36 of the coextrusion die 25, the melt 38 of thermoplastic material, in particular polyolefine, is extruded in the form of a tube 46 on to the pipe 8, directly downstream of the die 25—referred to the direction of production 9. The tube 46 is forced against the cylindrical outer surfaces 45 of the corrugated pipe 44 because of the partial vacuum in the interior chamber 24 of the coextruding head 7, the partial vacuum extending as far as into the zone of contact 47 between the tube 46 and the pipe 8. The tube 46 has a temperature which still allows welding. As mentioned, the outer surfaces 45 are heated to a corresponding temperature. Since, in addition, a corresponding air pressure acts from outside on the tube 46, reliable and solid welding takes place between the tube 46 and the outer surfaces 45. Since the mentioned partial vacuum prevails in the corrugation troughs 48 of the corrugated pipe 44, it may arrive that the tube 46 slightly buckles between the respective outer surfaces 45.

Figure 2:
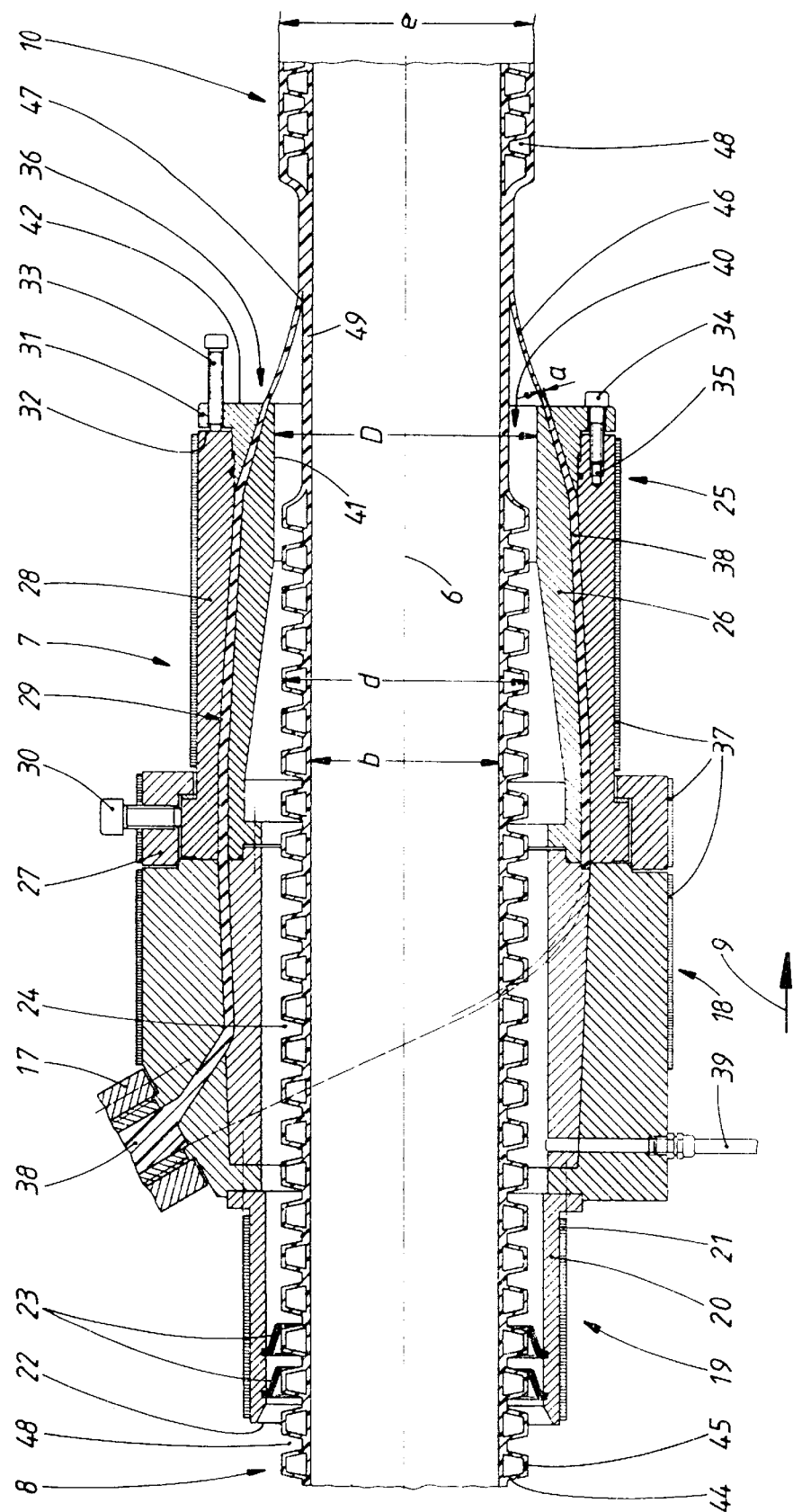
FIG. 2 is a longitudinal section through a coextruding head of the installation according to FIG. 1.
Figure 3:
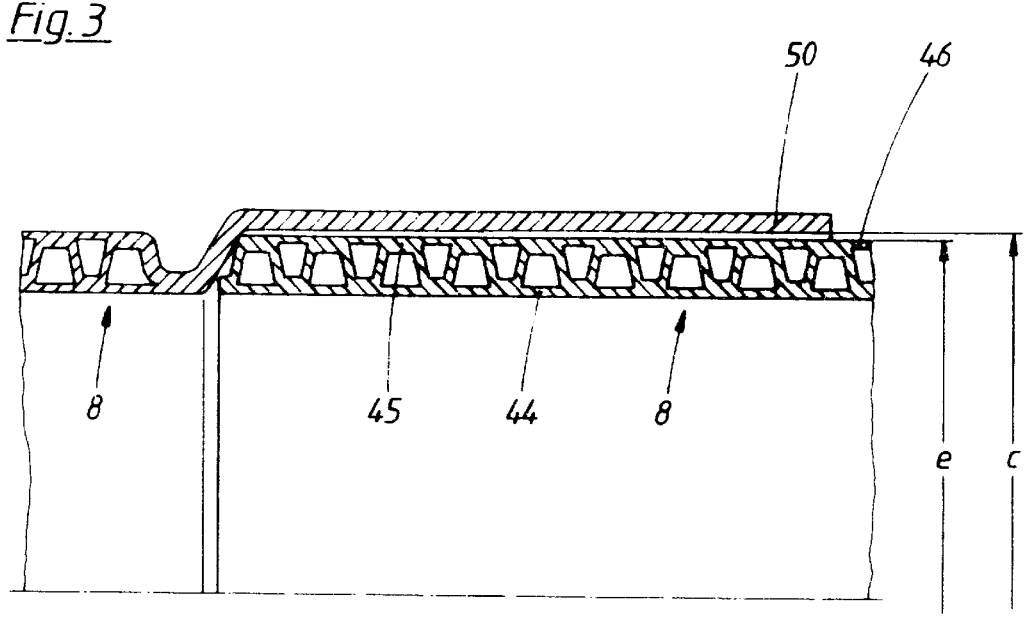
FIG. 3 is a longitudinal section through two three-layer pipes united by a socket.

If the pipe 8 has a smooth-wall section 49 within the corrugated pipe 44—as seen in FIG. 2 on the right—then the tube 46 lies over the full surface on this smooth-wall section 49 and is welded substantially over the fill surface with the latter under the mentioned pressure. The sealing arrangement 23 is such that is seals sufficiently even when the smooth-wall section 49 enters the extruding head 7 on the pipe inlet side 22. Setting the partial vacuum source (not shown) correspondingly will help prevent a pressure increase occurring on this occasion in the interior chamber 24. The production of such a smooth-wall section 49, the inside diameter b of which corresponds to the inside diameter b of the pipe 8, is known for instance from U.S. Pat. No. 5,472,659. This document also teaches the production of a twin-wall pipe 8 with a smooth-wall section in the form of a socket 50 as seen in FIG. 3. In this case, too, the tube 46 is extruded over this smooth-wall section in the form of a socket 50 and welded on it. The inside diameter c of such a socket 50 slightly exceeds the outside diameter e of the multilayer pipe 10 produced in the described way, which is a three-layer pipe 10 in the case described.

Such a socket 50 can, however, also be effected on the downstream socketing machine after the cutting of the multilayer pipe 10 by means of the separating station 14. In this case, the smooth-wall section 49 coated by the tube 46 is heated as usual and expanded to form a socket 50. FIG. 3 also illustrates how a multilayer pipe 10 is connected with an adjacent pipe 10 by means of such an integrally injection-molded socket 50.

Figure 4:
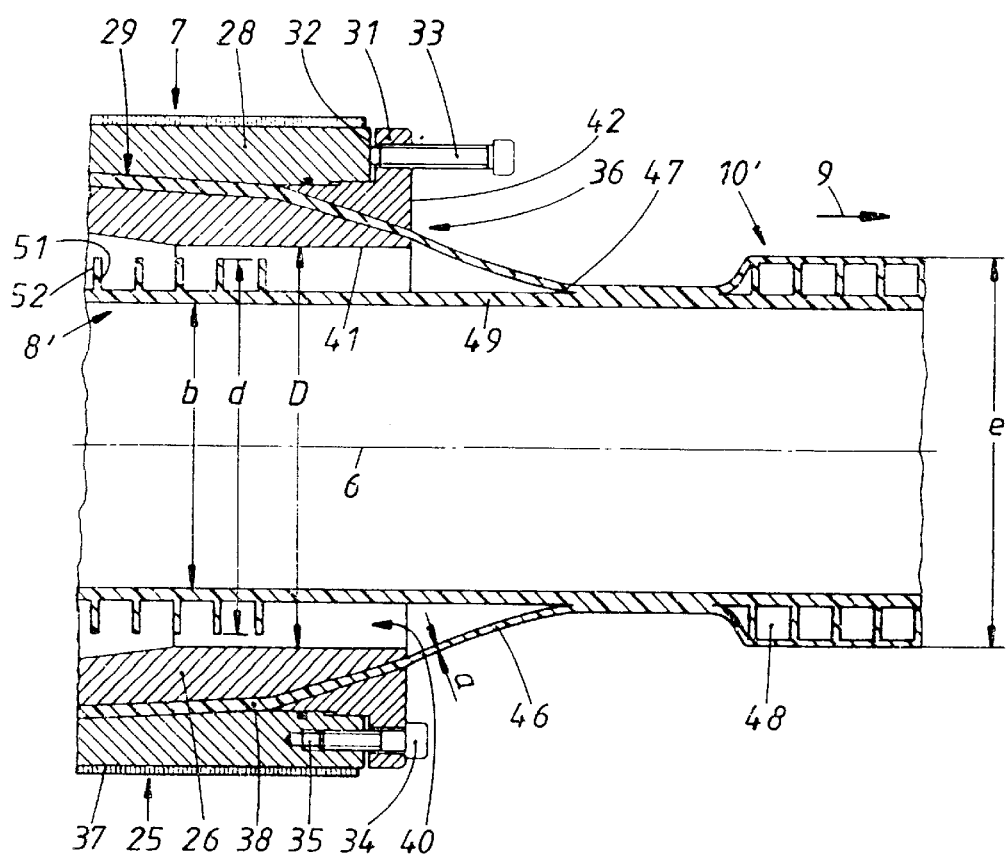
FIG. 4 is an illustration of the production of a multilayer pipe on the basis of a ribbed pipe.

Instead of a twin-wall pipe 8, any other type of externally profiled pipe, i.e. any pipe provided with structured wall cross-sections, can be provided with an additional skin which is formed by a tube 46 applied by extruding. FIG. 4 illustrates how a ribbed pipe 8' manufactured on a correspondingly designed extrusion equipment and a correspondingly designed calibrating arrangement is coated by such a tube 46 which only applies on the radially outer surfaces 51, heated to welding temperature, of the radially extending ribs 52 and is welded on them. In this way, the multilayer pipe 10' formed is a two-layer pipe. Also in the case of this ribbed pipe 8', a smooth-wall section 49' can be coated by the tube 46. This coated section 49' either serves as a spigot or is expanded to form a socket.

The thermoplastic materials used must not always be identical; it is of decisive importance that they can be welded together. This involves in particular polyolefines, it being possible to weld together polyethylene and polyethylene or polyethylene and polypropylene.

What is claimed is:

1. A method for the production of a multilayer pipe of thermoplastic material comprising the following steps:

producing a first thermoplastic pipe having a smooth inside pipe, an outer corrugated pipe welded to the inside pipe with said outer pipe having an external profiled corrugated shape, and said profiled corrugated shape having outer cylindrical surfaces and side surfaces;

maintaining the shape of said external profile corrugated shape;

heating to welding temperature said outer cylindrical surfaces of the external profiled corrugated shape to provide heated outer cylindrical surfaces on the external profiled corrugated shape;

providing pressure less than ambient pressure surrounding said heated outer cylindrical surfaces;

extruding a tube of thermoplastic material on to said heated outer cylindrical surfaces while maintaining the external profile corrugated shape;

providing ambient pressure on said tube to weld together the tube and the outer cylindrical surfaces by a difference in pressure between the ambient pressure on said tube and the less than ambient pressure on said heated outer surfaces; and cooling the resulting multilayer pipe.

2. A method according to claim 1 wherein said first pipe has at least one predominantly smooth-wall sections between two externally profiled shape sections and wherein said tube is welded by said difference in pressure on said at least one smooth-wall sections substantially over a fill surface thereof.

3. A method according to claim 2 wherein a smooth-wall section is expanded to form a socket.

4. A method according to claim 1 wherein said first pipe is a twin-wall pipe having a smooth inside pipe and a corrugated outer pipe welded to the inside pipe and wherein said tube is welded by said difference in pressure onto outer corrugated surfaces of said corrugated pipe without deforming said outer corrugated surfaces.

5. A method according to claim 1 wherein the multilayer pipe is cooled by cooling air.

6. A method according to claim 1 wherein the multilayer pipe is cooled by cooling water.

7. A method for the production of a multilayer pipe of thermoplastic material comprising the following steps:

producing a first thermoplastic pipe having a smooth inside surface with a plurality of spaced cylindrical ribs projecting radially outward from an outer pipe surface, said ribs having an outer circumference end surface; maintaining the ribs projecting radially outward;

heating to welding temperature said outer circumferential end surfaces to provide heated outer circumferential end surfaces;

providing pressure less than ambient pressure surrounding said heated outer circumferential end surfaces;

extruding a tube of thermoplastic material on to said heated outer circumferential end surfaces while maintaining the ribs projecting radially outward;

providing ambient pressure on said tube to weld together the tube and the outer surfaces by a difference in pressure between the ambient pressure on said tube and the less than ambient pressure on said heated outer surfaces and wherein the tube is spaced from the outer pipe surface; and cooling the resulting multilayer pipe.

8. A method according to claim 7 wherein the tube is welded onto the outer end surfaces without deforming the ribs.

* * * * *